W. J. BOSSEMEYER.
CARRIAGE LIGHT FRAME.
APPLICATION FILED APR. 4, 1919.
1,371,729.
Patented Mar. 15, 1921.
2 SHEETS—SHEET 1.
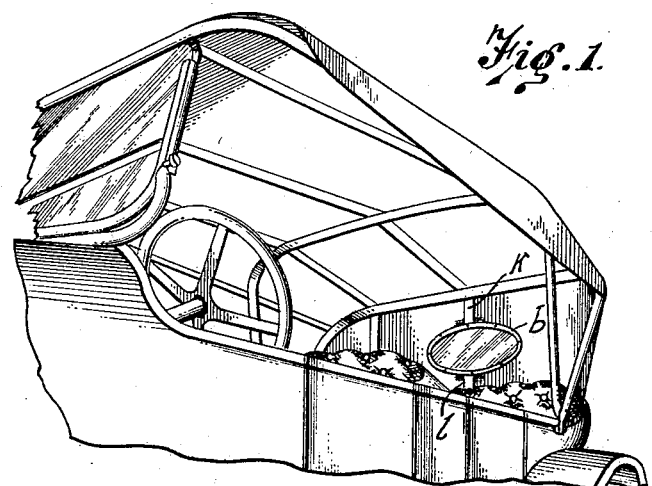
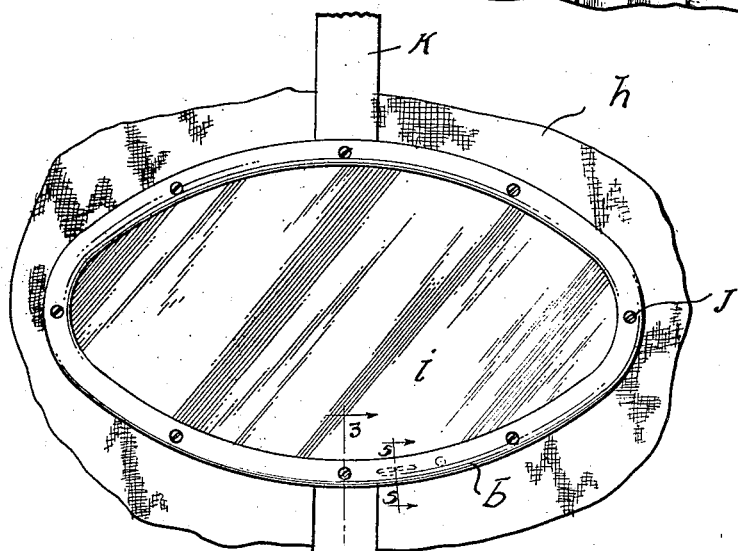
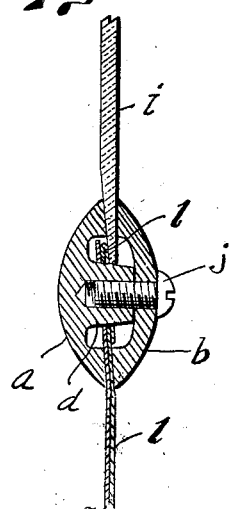
Inventor
William J. Bossemeyer
By Stuart C. Barnes
Attorney

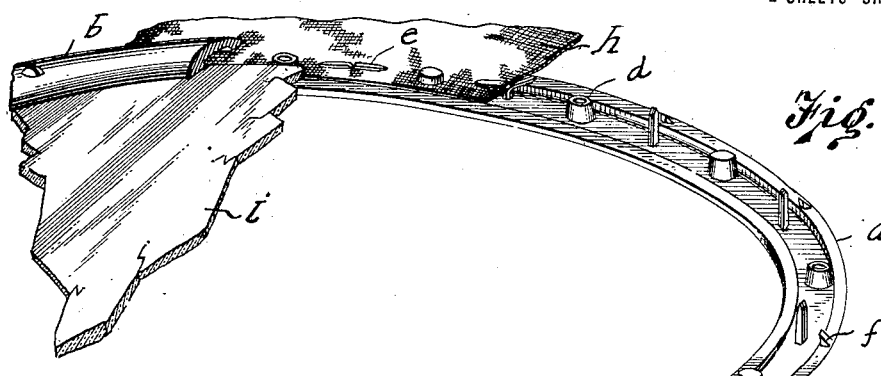
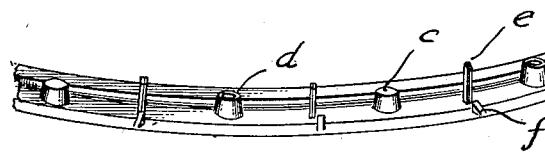
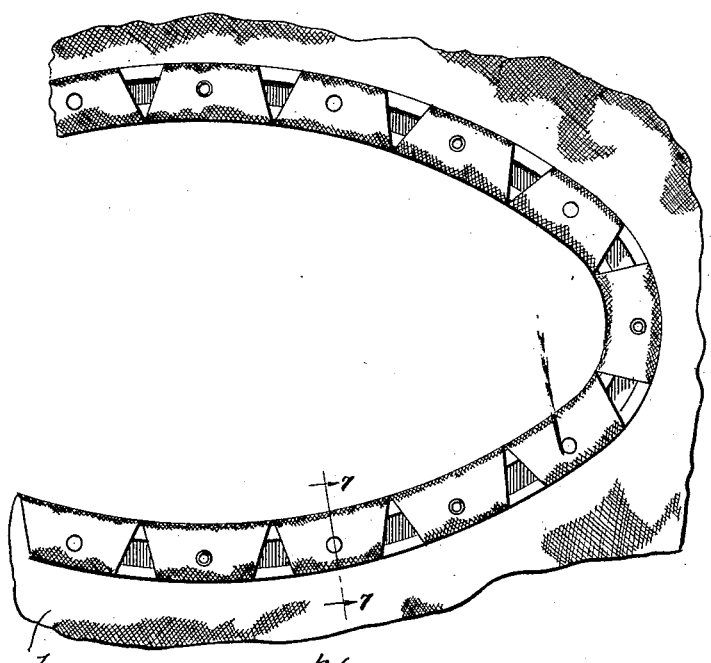
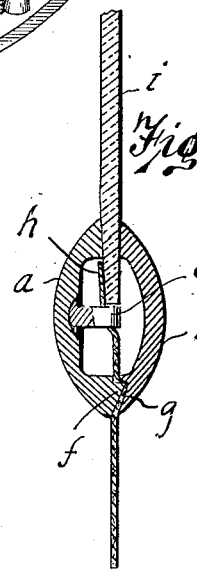

UNITED STATES PATENT OFFICE.

WILLIAM J. BOSSEMEYER, OF CINCINNATI, OHIO.

CARRIAGE-LIGHT FRAME.

1,371,729. Specification of Letters Patent. Patented Mar. 15, 1921.

Application filed April 4, 1919. Serial No. 287,405.

*To all whom it may concern:*

Be it known that I, WILLIAM J. BOSSEMEYER, a citizen of the United States, residing at Cincinnati, county of Hamilton, State of Ohio, have invented a new and useful Improvement in Carriage-Light Frames, of which the following is a specification.

This invention relates to rear lights for automobile tops. It has for its object an improved frame for retaining the glass. This frame is constructed so as to relieve the glass from substantially all strain when the frame parts are brought together. A very important feature of the construction is that the frame is arranged to affix itself to the rear curtain or back of the top so as to accurately locate itself thereon and retain this proper location even when one side of the frame is removed to get access to the glass. In rear light frames now commonly used, no provision of this character is made, and the consequence is it requires great difficulty to properly place the frame on the fabric and even then the fabric is drawn in some places and loose in others, presenting a crinkled and unsatisfactory appearance. This is obviated by the devices in connection with my frame which accurately locate the frame upon the fabric when the latter has been prepared to receive them. These devices have the additional function of securely holding the fabric to the window frame so it is practically impossible to tear the two apart and also acting as spacers to prevent the glass being broken by clamping the frame members upon it. They also protect the fabric from being torn by the screws.

Another feature of the present construction is the suspension of the rear light frame from the top by means of a strap on the inside of the top so as to prevent the rear light sagging and presenting an undesirable appearance. These features of construction will better appear after the detail structure is understood.

In the drawings,—

Figure 1 is an inside perspective view of an automobile top showing the rear light suspended both from the top by a strap and fastened to the top of the body by a second strap.

Fig. 2 is an enlarged elevation of the rear light.

Fig. 3 is a section on the line 3—3 of Fig. 2.

Fig. 4 is a perspective view with parts broken away showing how the rear light frame is made up.

Fig. 5 is a section on the line 5—5 of Fig. 2.

Fig. 6 is a view showing how the rear fabric can be applied to my rear light frame so as to make the frame invisible from the outside.

Fig. 7 is a section on the line 7—7 of Fig. 6.

The frame is made up of two oval channels, the outer channel designated $a$ and the inner channel designated $b$. These are preferably aluminum castings. Of course, the frame bars could be any other shape but oval is the usual shape adopted for rear lights. The outer channel bar $a$ is provided with a plurality of pegs $c$ and $d$ molded in the channel space of the channel bar. These pegs $c$ and $d$ are equally spaced along the inside of the channel bar and alternate as solid pegs $c$ and tapped pegs $d$. Between the pegs are molded clips having two prongs $d$, comprising sheet metal that is set into the aluminum when the same is in the mold and the heads of these clips or prongs are molded into the aluminum (Fig. 5).

I employ preferably on the outside rim of the outside channel bar $a$ a plurality of sharp spurs $f$ which are adapted to bite into the fabric and force the same into companion notches $g$ in the inside channel bar $b$.

The rear curtain or the back fabric $h$ is properly cut by a pattern or other suitable means so as to provide holes for each one of the pegs $b$ and $c$. The pointed prongs $e$ of the clip are sharp enough to penetrate the fabric by impaling the fabric thereupon. By punching the fabric in accordance with the pattern before it is laid upon the outside frame bar, the fabric is caused to lie flat, smoothly and uncrinkled upon the frame bar. The inside frame bar $b$ may then be fitted over the fabric and the outside frame bar including the glass $i$ and screws $j$ applied to clamp the two bars together, the threads of the screws taking effect in the tapped pegs $d$. These tapped pegs $d$, therefore, have a variety of functions, namely, they form the screw sockets to take the threads of the screws $j$ and provide relatively long and strong threads; they act as spacers for the two frame bars and insure the frame bars never being screwed down far enough so as to break the glass; they act to locate the fabric after it has been suitably punched by the pattern in true and accurate relation along the frames and in a smooth and uncrinkled condition; they act to firmly retain the fabric to the frames by a bearing of such large section as to not be calculated to rip or tear the fabric in case an unusual strain is put upon the fabric tending to separate it from the frame; they keep the fabric from contact with the screws and hence from being torn; and finally, they also form a barrier to keep the glass in place.

The spurs $f$ are an added feature for securing the fabric to the frame but it will be obvious they are not absolutely essential. The purpose of the clip prongs $e$ is to hold the fabric in place when the inside frame member $b$ is taken off to secure access to the glass. Otherwise the fabric might become displaced from the pegs and require some trouble to properly replace it upon the pegs. These prongs being made of a soft material like ordinary paper clips, can be turned over in the position shown at the top of Fig. 4 so as to hold the fabric to the pegs.

In Figs. 6 and 7 the same frame is shown but is applied to the fabric in a slightly different way by cutting out pieces of material and turning back the intervening pieces, as is shown in Fig. 6. This allows the outside frame bar to become concealed on the inside of the fabric. In this figure the clips $e$ are not shown as they are not absolutely necessary.

In most jobs carrying a glass rear light the same will in time sag and also cause the surrounding fabric to wrinkle. I overcome this by utilizing straps for suspending the window from the rear bow and from the top of the body. The strap $k$ (Fig. 1) suspends the frame from the rear bow and the strap $l$ straps the bottom of the frame to the top of the body.

An examination of Figs. 5 and 7, especially Fig. 7, will indicate that the outside rims of the frame are higher than the inner rims or glass-retaining rims. This with the spacing pegs insures most of the stresses of clamping the two frame members together falling on the outside rims and not on the glass where it is liable to crack or break the glass.

What I claim is:

1. A light frame for carriages, having in combination, a pair of channel frames laid with their openings facing each other and the inner rims of which form a grip for the glass, one of the frames being provided with integral pegs, some of which are tapped, and screws passing through the other frame into the tapped holes of the peg to clamp the two frames together, the ends of the pegs adapted to contact the inside of the other channel frame to space the frames.

2. A light frame for carriages, having in combination, a pair of channel frame bars adapted to be laid with their channel openings facing each other, the outer rims of said channels adapted to grip the fabric and the inner rims adapted to engage the glass, pegs integrally formed with one of the channel frames, some of which are tapped and which serve to locate the fabric on one of the frame members, the said pegs acting as spacers between the two channel bars, and screws passing through the other frame member and into the tapped pegs to clamp the two frame members together.

3. A light for carriages, comprising a pair of channel frames spaced apart at their inner edges to receive a glass, integral pegs on one frame engaging portions of the other frame to limit the approach of the frames and the pressure against the glass, some of the said pegs being tapped, and screws passing through the one frame and into the tapped pegs of the other frame for clamping the two frames together and upon the glass.

4. A light for a carriage, comprising a pair of frames spaced apart at their inner edges to receive a glass, one of the frames being a channel frame and one of the frames having integral pegs engaging portions of the other frame to limit the approach of the frames and the pressure against the glass, some of the said pegs being tapped, and screws passing through one frame into the tapped pegs of the other frame for clamping the two frames together and upon the glass.

In witness whereof I have hereunto set my hand on the 2nd day of April, 1919.

WILLIAM J. BOSSEMEYER.